US009289920B2

(12) United States Patent
Duinen et al.

(10) Patent No.: US 9,289,920 B2
(45) Date of Patent: Mar. 22, 2016

(54) SYSTEM AND METHOD FOR PREPARING, DISPENSING, AND CURING EPOXY

(71) Applicant: North American Interconnect LLC, Scottsdale, AZ (US)

(72) Inventors: Keith Van Duinen, Rio Rico, AZ (US); Miguel Rodriguez, Hermosillo (MX); Alejandro Leon, Hermosillo (MX)

(73) Assignee: North American Interconnect LLC, Scottsdale, AZ (US)

( * ) Notice: Subject to any disclaimer, the term of this patent is extended or adjusted under 35 U.S.C. 154(b) by 309 days.

(21) Appl. No.: 13/837,000

(22) Filed: Mar. 15, 2013

(65) Prior Publication Data

US 2014/0263402 A1 Sep. 18, 2014

(51) Int. Cl.
*B05C 11/10* (2006.01)
*B29C 31/06* (2006.01)
*B29L 11/00* (2006.01)
*B29C 39/24* (2006.01)
*B29K 63/00* (2006.01)
(Continued)

(52) U.S. Cl.
CPC ........... *B29C 31/06* (2013.01); *B29B 2013/005* (2013.01); *B29C 39/24* (2013.01); *B29K 2063/00* (2013.01); *B29L 2011/0075* (2013.01); *G02B 6/3861* (2013.01)

(58) Field of Classification Search
CPC . B29L 2011/0075; B29C 31/06; B29C 39/24; B29B 2013/005; B29K 2063/00; B05C 11/1002
USPC ................ 222/1, 52, 55, 56, 394; 385/76–80
See application file for complete search history.

(56) References Cited

U.S. PATENT DOCUMENTS 5,165,961 A * 11/1992 Freeman ................. B05C 11/10
118/323
5,509,966 A 4/1996 Sykes
(Continued)

FOREIGN PATENT DOCUMENTS

| KR | 100803975 B1 | 2/2008 |
| WO | 0029889 A1 | 5/2000 |
| WO | 2005109061 A1 | 11/2005 |

OTHER PUBLICATIONS

International Search Report and Written Opinion for PCT/US2014/027022, Int'l Filing Date Mar. 14, 2014.

*Primary Examiner* — Kevin P Shaver
*Assistant Examiner* — Robert Nichols, II
(74) *Attorney, Agent, or Firm* — Benesch, Friedlander, Coplan & Aronoff LLP

(57) ABSTRACT

A method for dispensing epoxy comprising the step of degassing an epoxy. The method further comprises the step of associating the epoxy with an epoxy injector comprising a dispensing end. The method further comprises the step of a computer receiving data representative of a selected container to receive the epoxy. The method further comprises the step of a computer determining a dispensing rate and a dispensing amount, based on the received data. The method further comprises the step of a computer causing the epoxy injector to dispense the determined dispensing amount of epoxy, via the dispensing end, at the determined dispensing rate. The method further comprises the step of a computer causing a dispensing arm, supporting the dispensing end, to retract the dispensing end while the epoxy injector is dispensing the epoxy. The method further comprises the step of curing the dispensed epoxy.

5 Claims, 5 Drawing Sheets

(51) Int. Cl.
*G02B 6/38* (2006.01)
*B29B 13/00* (2006.01)

(56) References Cited

U.S. PATENT DOCUMENTS

| | | |
|---|---|---|
| 5,741,457 A | 4/1998 | Iida |
| 6,562,164 B1 * | 5/2003 | Faulkner .............. G02B 6/3861 156/64 |
| 2003/0009869 A1 | 1/2003 | Strandberg |
| 2003/0130760 A1 | 7/2003 | Abraham et al. |
| 2005/0045653 A1 * | 3/2005 | Tanaka .................... B05B 15/08 222/1 |
| 2011/0014367 A1 | 1/2011 | Wells |
| 2013/0327269 A1 * | 12/2013 | Suhara .................. B05C 5/0258 118/323 |
| 2015/0251208 A1 * | 9/2015 | Tanaka .................. B05C 5/0225 141/18 |

* cited by examiner

SYSTEM AND METHOD FOR PREPARING, DISPENSING, AND CURING EPOXY

BACKGROUND

Epoxy is commonly used to assemble fiber optic cable with fiber optic connectors. Epoxy is injected into a connector using a needle or syringe. The syringe is then withdrawn and a fiber cable is inserted in the connecter. The fiber optic cable/connecter assembly is then cured. If not assembled properly, however, fiber optic cable connector assemblies can breakdown and fail. Specifically, inclusion of bubbles inside a fiber optic cable/connector assembly can result in structural failure during the life of the product.

Incorrectly withdrawing the syringe from a connecter after injecting the epoxy can lead to structural failure of the product as well. Specifically, when extracting the needle at an incorrect speed, epoxy residue may be left on the inside walls of the connector body as a result of excess epoxy migrating to the outside of the needle and then transferring to the connector wall. Once cured, this material can break free of the connector wall and potentially contaminate the installation environment, and eventually lead to connection failure.

SUMMARY OF THE INVENTION

A method for dispensing epoxy comprising the step of degassing an epoxy. The method further comprises the step of associating the epoxy with an epoxy injector comprising a dispensing end. The method further comprises the step of a computer receiving data representative of a selected container to receive the epoxy. The method further comprises the step of a computer determining a dispensing rate and a dispensing amount, based on the received data. The method further comprises the step of a computer causing the epoxy injector to dispense the determined dispensing amount of epoxy, via the dispensing end, at the determined dispensing rate. The method further comprises the step of a computer causing a dispensing arm, supporting the dispensing end, to retract the dispensing end while the epoxy injector is dispensing the epoxy. The method further comprises the step of curing the dispensed epoxy.

A system for dispensing epoxy comprises a dispensing end. The system further comprises a support arm configured to support the dispensing end. The system further comprises at least one processor, at least one computer-readable tangible storage device, and program instructions stored on the at least one storage device for execution by the at least one processor. The program instructions comprise first program instructions configured to receive data representative of a selected container to receive epoxy. The program instructions further comprise second program instructions configured to determine a dispensing rate and a dispensing amount, based on the received data. The third program instructions further comprise third program instructions configured to cause the determined dispensing amount of epoxy to be dispensed, through the dispensing end, at the determined dispensing rate. The program instructions further comprise fourth program instructions configured to cause the support arm to retract the dispensing end while epoxy is being dispensed through the dispensing end.

A system for dispensing epoxy comprises an epoxy injector comprising a dispensing needle and a supporting arm configured to support the dispensing needle. The system further comprises a first programmable logic controller. The first programmable logic controller is configured to receive data representative of a selected container to receive the epoxy. The first programmable logic controller is further configured to determine a dispensing rate and a dispensing amount, based on the received data. The first programmable logic controller is further configured to cause the epoxy injector to dispense the determined dispensing amount of epoxy, via the dispensing needle, at the determined dispensing rate. The system further comprises a second programmable logic controller in data communication with the first programmable logic controller, and configured to cause the supporting arm to retract the dispensing needle while the first programmable logic controller is causing the epoxy injector to dispense the epoxy.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
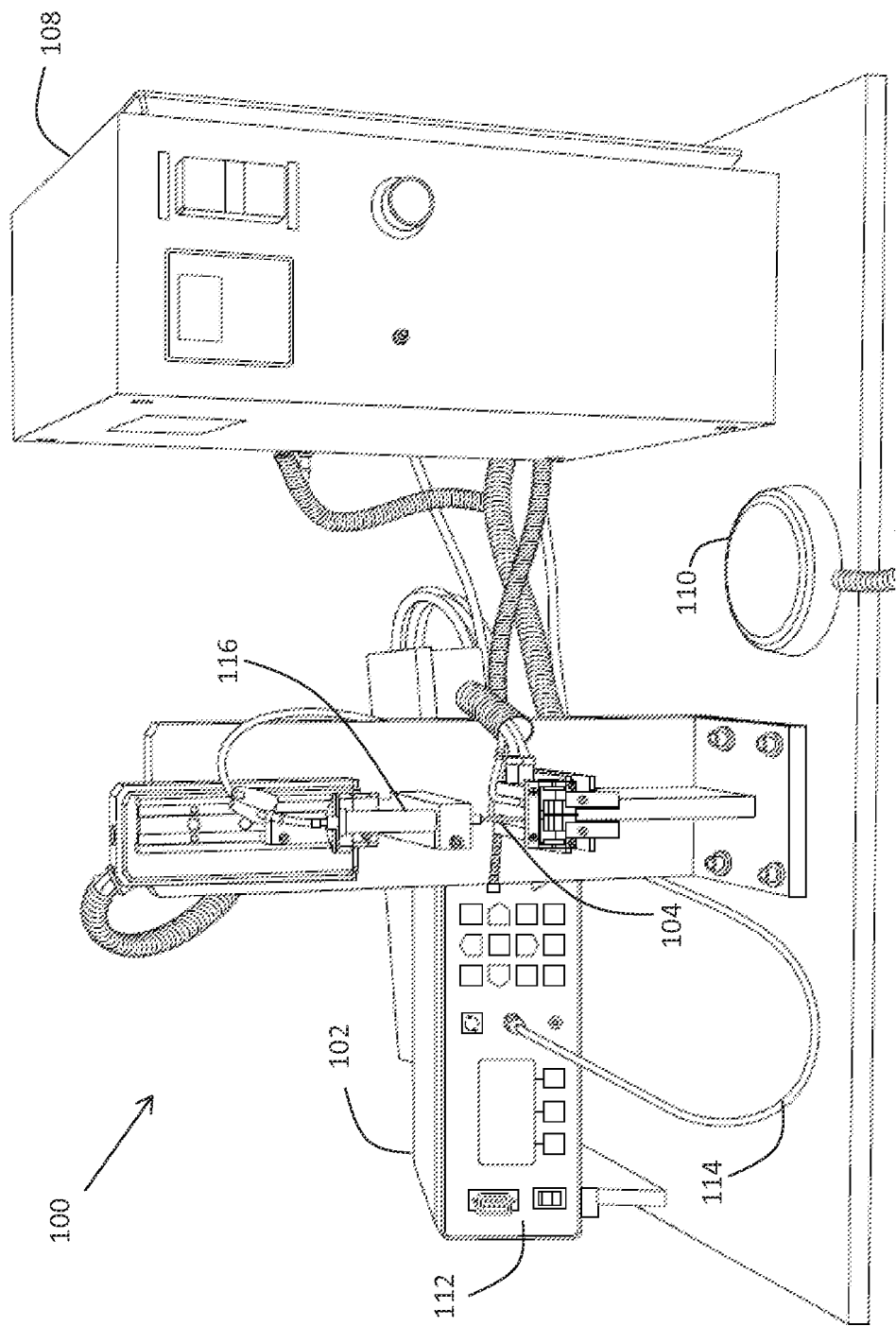
FIG. 1 illustrates an embodiment of an example system for dispensing epoxy.

FIG. 1 illustrates an embodiment of an example system 100 for dispensing epoxy. System 100 enables an operator to inject a defined and controlled amount of epoxy into a designated area without leaving residue in or around the area. For example, system 100 may be used to inject epoxy into a cavity of a fiber optic cable connector. Eliminating residue may eliminate possibility for contamination and thereby may help prevent a fiber optic cable connector from failing structurally.

It should be understood that, although the systems and methods described herein make reference to dispensing epoxy into a cavity of a fiber optic cable connector, the systems and methods may similarly be applies to dispensing epoxy into other suitable containers or objects comprising a cavity for receiving epoxy.

System 100 includes an epoxy dispenser (or injector) 102 configured to dispense an epoxy solution. Epoxy dispenser 102 can be an Engineered Fluid Dispenser (EFD) manufactured by Nordson, for example. Epoxy dispenser can also be another suitable device configured to dispense a defined amount of fluid at a defined rate, with the ability to compensate for changes in viscosity over time. Epoxy dispenser may include a user interface 112 configured to receive data from an operator. User interface may include suitable buttons, switches, dials, and so on.

Figure 2:
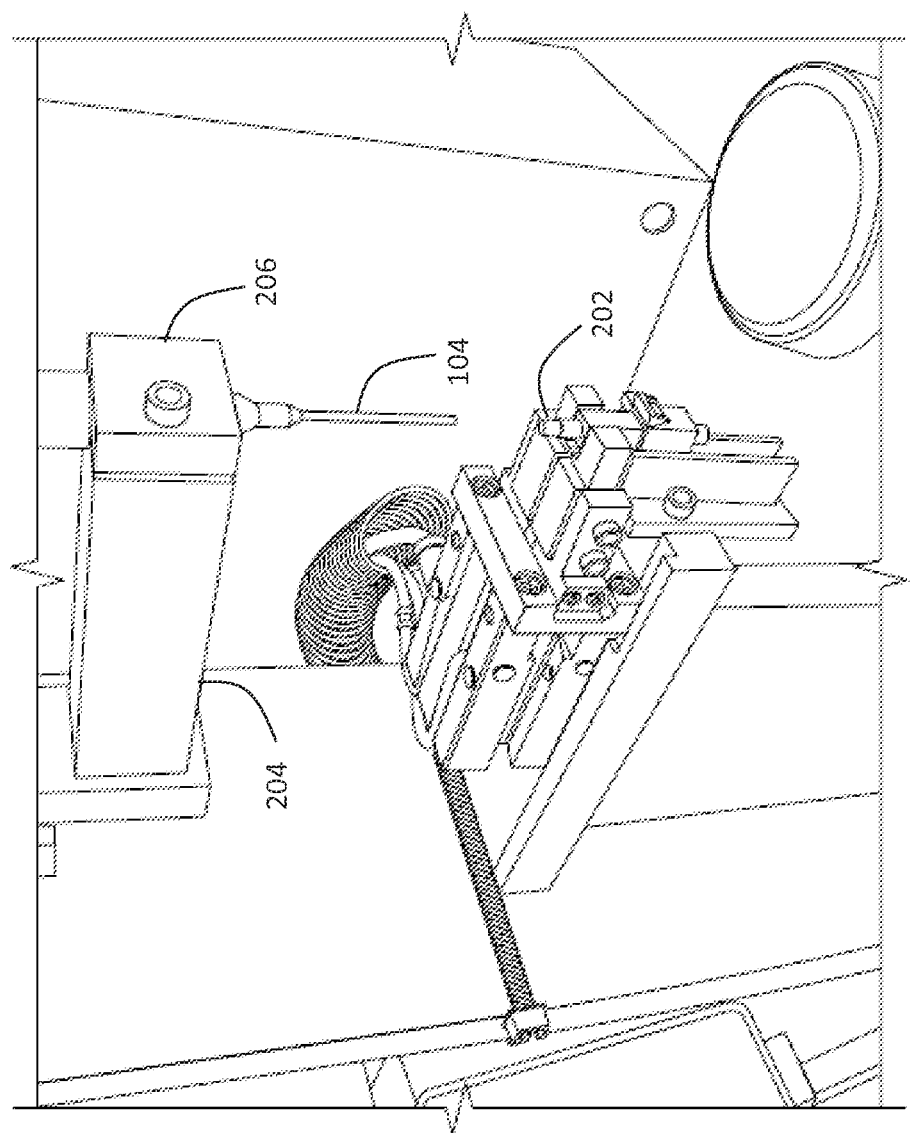
FIG. 2 illustrates an embodiment of an example dispensing syringe positioned above an example fiber optic connector.

Epoxy dispenser 102 includes a dispensing tube 114 for delivering pressurized air to an epoxy tube 116 in order to force epoxy to be dispensed from the epoxy tube 116. Epoxy tube 116 has a dispensing syringe 104 (also referred to as a needle or a dispensing end), for directing dispensed epoxy from epoxy tube 116 to a specific area or location. FIG. 2 illustrates an embodiment of an example dispensing syringe 104 positioned above an example fiber optic connector 202. Dispensing syringe 104 is supported by a supporting arm 204 having a holding clamp 206 to securely hold dispensing syringe 104. In the illustrated example, dispensing syringe 104 is configured to direct epoxy into a cavity of fiber optic connector 202 while retracting at a controlled rate from the connector.

Referring back to FIG. 1, system 100 includes a programmable logic controller (PLC) 108, in data communication with epoxy dispenser 102, and configured to control the speed at which needle is retracted from the connector. The amount of epoxy being dispensed is controlled by the PLC in epoxy dispenser 102. PLC 108 is further configured to cause supporting arm 204 to retract dispensing syringe 106 while epoxy is being dispensed through the dispensing syringe 106.

PLC 108 may be any suitable computing device capable of executing program instructions. It should be understood that, although PLC 108 is illustrated as a standalone device, PLC 108 may also be embedded within epoxy dispenser 102. In one example, system 100 may include two PLCs. In such an example, a first PLC may be configured to control epoxy dispenser 102 to dispense a defined amount of epoxy at a defined rate, compensating for viscosity change over time, while a second PLC may be configured to control the retraction of supporting arm 204. The first PLC may be embedded within epoxy dispenser 102 while the second PLC may remain a standalone device in data communication with the first PLC embedded in epoxy dispenser 102.

System 100 further includes an activation pedal 110 configured to activate PLC 108. In other words, PLC 108 may be configured to initiate an epoxy dispensing sequence when an operator pushes on the activation pedal 110. It should be understood that activation pedal 110 may be any suitable form of button, switch, and so on, electrical or mechanical, capable of initiating PLC 108.

In one example, system 100 further includes an epoxy degasser (not shown) configured to degas and remove bubbles from the epoxy before the epoxy is dispensed by epoxy dispenser 102. The epoxy degasser includes a centrifuge as well as a vacuum degasser. The combination may enable an operator to remove a greater number of bubbles from the epoxy, which increases the process capability (consistent shot size) of the epoxy dispenser and may prevent structural failure of the fiber optic connector.

In one example, system 100 further includes an epoxy curing device (not shown) configured to cure the epoxy after injection into a fiber optic cable connector. The epoxy curing device is configured to cure the epoxy at two different temperatures. In one example, system 100 includes two epoxy curing devices (not shown), each configured to cure the epoxy at a different temperature. Curing the epoxy at a lower temperature before raising the curing temperature may allow for bubbles remaining in the epoxy after degassing to freeze and remain entrapped at a smaller size. This may further prevent a fiber optic cable connector from failing structurally.

Figure 3:
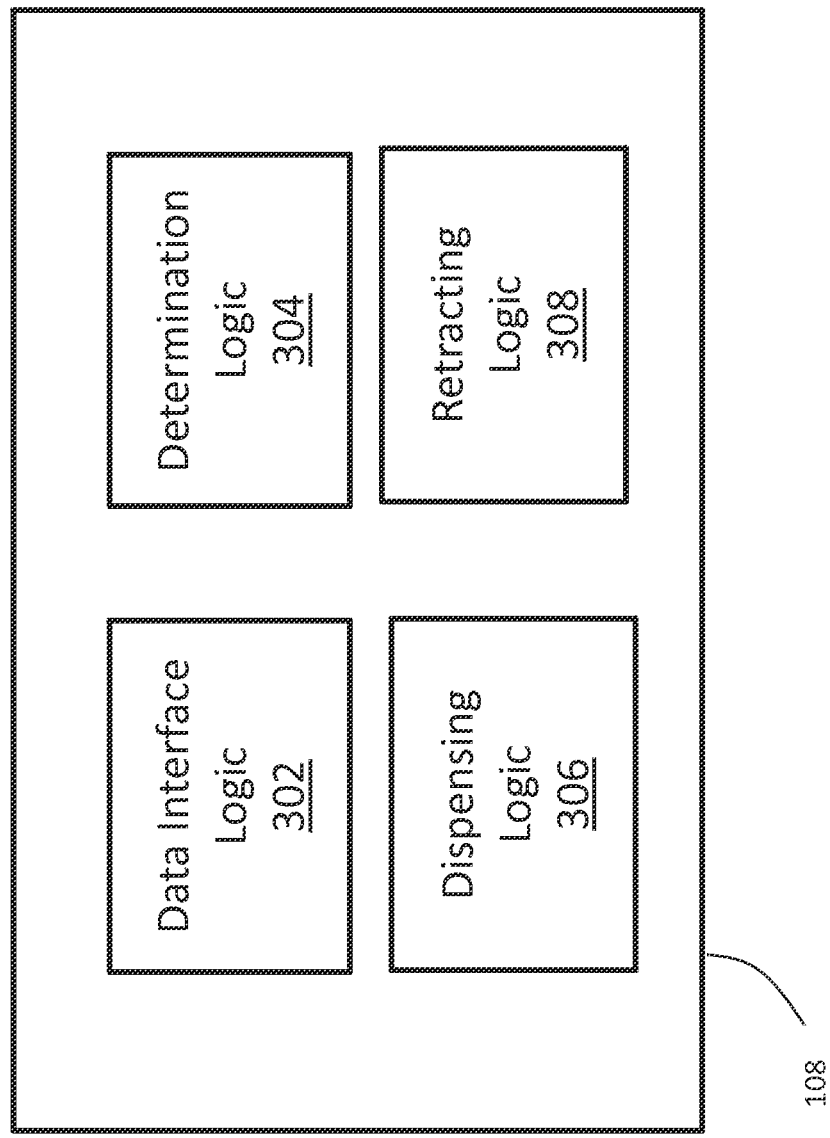
FIG. 3 illustrates a block diagram of an example programmable logic controller of a system for dispensing epoxy.

FIG. 3 illustrates a block diagram of an example programmable logic controller (PLC) 108 of FIG. 1. PLC 108 includes a data interface logic 302 configured to receive information about a selected container or connector. Data interface logic 302 may receive data from user interface 112. Data interface logic 302 may also be configured to communicate with a data store in order to retrieve additional information corresponding to the received data about a selected connector.

PLC 108 further includes determination logic 304 configured to determine a dispensing rate and a dispensing amount based on received data about a connector selected to receive the epoxy. For example, data interface logic 302 may receive information indicating that a selected fiber optic connector or container has a particular shape or size cavity. Determination logic 304 may then perform a calculation or instruct interface logic 302 to access a data store to determine the dispensing rate or a dispensing amount based on the selected connector or based on the shape or size of the selected fiber optic connector cavity.

PLC 108 further includes dispensing logic 306 configured to control epoxy dispenser 102 to dispense the determined amount of epoxy at the determine rate. In one example, dispense logic 306 is configured to maintain a constant dispense rate. In one example, dispense logic 306 is configured to adjusting the dispense rate at certain time intervals to account for changes in the viscosity of the epoxy during the time intervals. Thus, dispense logic 306 is able to control epoxy dispenser to deliver epoxy to a target area at a constant rate over time, even though the viscosity of the epoxy may change over time. In one example, dispense logic 306 is configured to adjust and therefore maintain a constant dispense rate by controlling the air pressure of epoxy dispenser 102.

PLC 108 further includes retraction logic 308 configured to cause supporting arm 204 retract dispensing syringe 104 while the epoxy dispenser 102 is dispensing the epoxy. In one example, retraction logic 308 is further configured to instruct determination logic 304 to determine a variable retraction rate based on a shape of a cavity of a selected connector, and to cause supporting arm 204 to retract the dispensing syringe at the determined variable retraction rate or speed.

Figure 4:
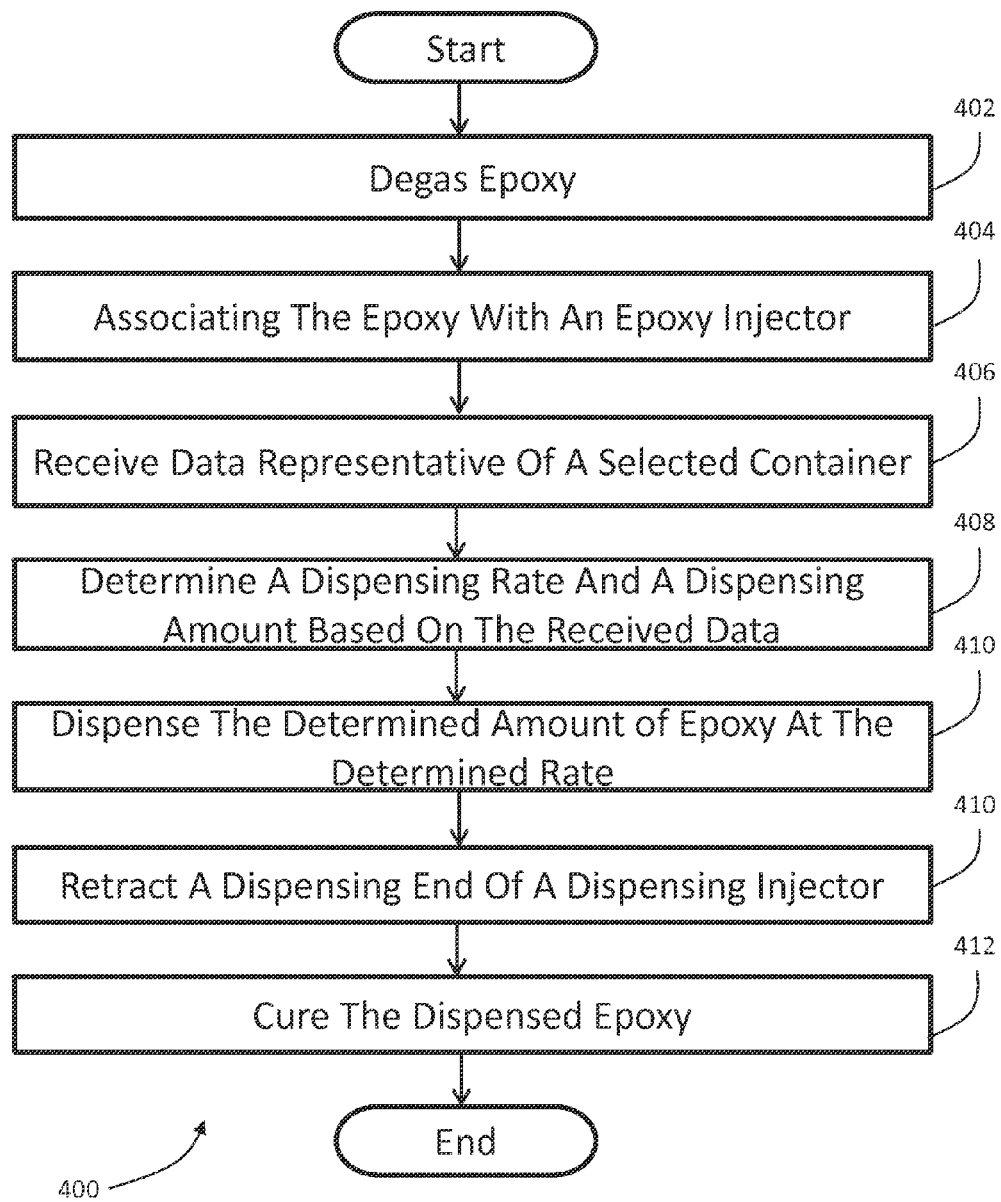
FIG. 4 is a flow chart illustrating an example method for preparing, dispensing, and curing epoxy.

FIG. 4 is a flow chart illustrating an example method for preparing, dispensing, and curing epoxy. At step 402, an operator degasses an epoxy solution. In one example, an operator first degasses the epoxy using a centrifuge for a first length of time and then degasses the epoxy using a vacuum for a second length of time.

At step 404, the operator associates the epoxy solution with epoxy dispenser 102. For example, the operator may place epoxy tube 116 into holding clamp 206 of supporting arm 204.

At step 406, PLC 108 receives data representative of a selected connector. At step 408, PLC 108 determines a dispensing rate and a dispensing amount based on the received data. At step 410, PLC 108 causes epoxy dispenser 102 to dispense the determined dispensing amount of epoxy, via dispensing syringe 104, at the determined dispensing rate. At step 412, PLC 108 causes supporting arm 204 to retract dispensing syringe 104 while epoxy dispenser 102 is dispensing the epoxy.

At step 412, an operator cures the dispensed epoxy. In one example, an operator cures the epoxy in two stages by heating the dispensed epoxy at first temperature for a first predetermined amount of time, and heating the dispensed epoxy at a second temperature for a second predetermined amount of time.

Figure 5:
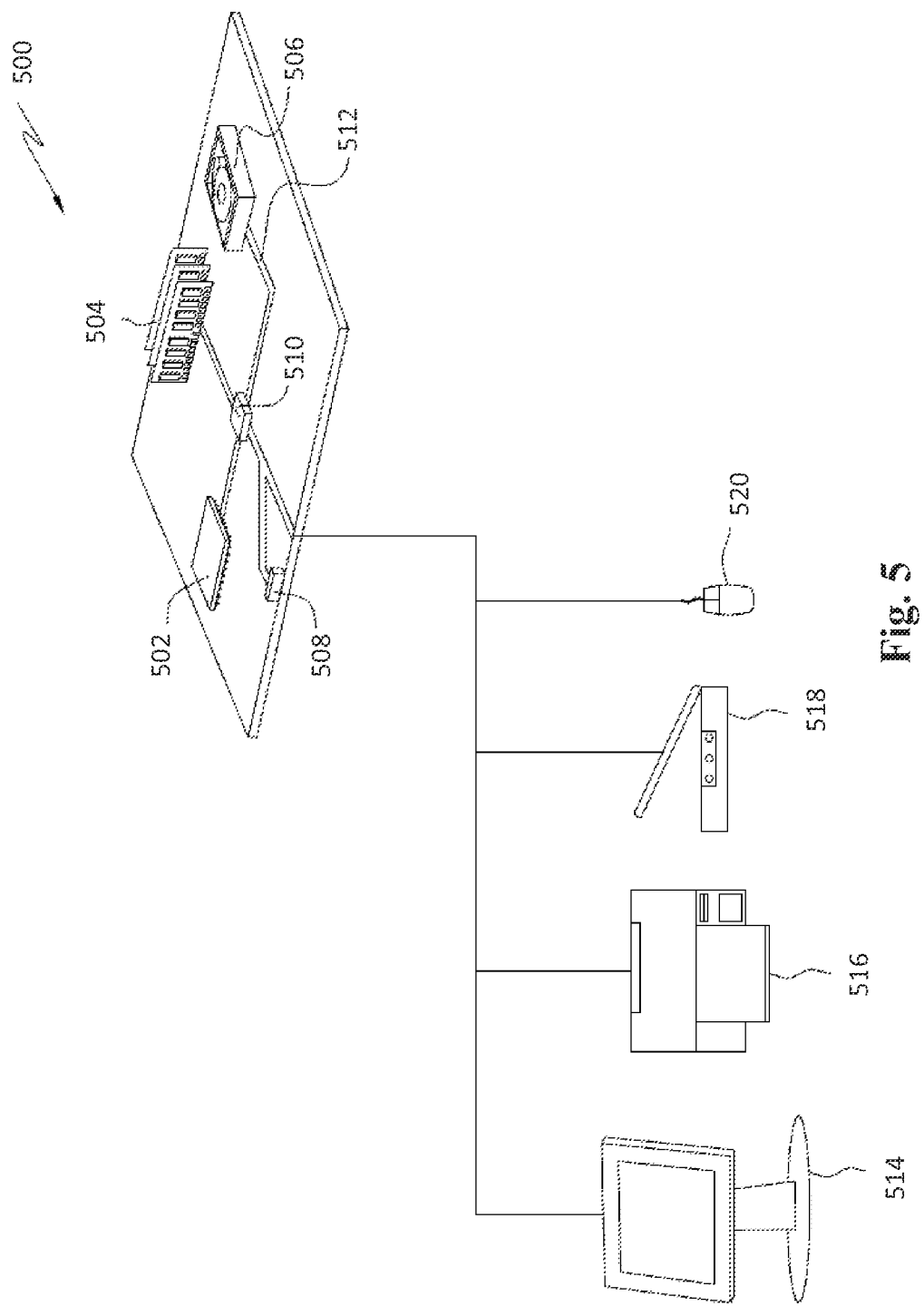
FIG. 5 is a block diagram of an example computing device for implementing an example controller of a system for dispensing epoxy.

FIG. 5 is a block diagram of an example computer system 500 for implementing an example controller of a system for dispensing epoxy. Computer system 500 is intended to represent various forms of digital computers, including laptops, desktops, handheld computers, tablet computers, servers, and other similar types of computing devices such as a programmable logic controller. Computer system 500 includes a processor 502, memory 504, a storage device 506, and a communication port 522, connected by an interface 508 via a bus 510.

Processor 502 processes instructions, via memory 504, for execution within computer system 500, including data interface logic 302, determination logic 304, dispensing logic 306, and retracting logic 308 stored on storage device 506. In an example embodiment, multiple processors along with multiple memories may be used. In an example embodiment, multiple computer systems 500 may be connected, with each device providing portions of the necessary operations.

Memory 504 may be volatile memory or non-volatile memory. Memory 504 may be a computer-readable medium, such as a magnetic disk or optical disk. Storage device 506 may be a computer-readable medium, such as floppy disk devices, a hard disk device, and optical disk device, a tape device, a flash memory, or other similar solid state memory device, or an array of devices, including devices in a storage area network of other configurations. A computer program product can be tangibly embodied in a computer readable medium such as memory 504 or storage device 506. The computer program product may contain data interface logic 302, determination logic 304, dispensing logic 306, and retracting logic 308.

Computer system 500 can be coupled to one or more input and output devices such as a display 514, a scanner 518, a printer 516, and a mouse 520.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Some portions of the detailed descriptions are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A system for dispensing epoxy, comprising:
    an epoxy injector comprising a dispensing needle and a supporting arm configured to support the dispensing needle;
    a first programmable logic controller configured to:
        receive data representative of a selected container to receive the epoxy;
        determine a dispensing rate and a dispensing amount, based on the received data; and
        cause the epoxy injector to dispense the determined dispensing amount of epoxy, via the dispensing needle, at the determined dispensing rate;
    a second programmable logic controller in data communication with the first programmable logic controller, and configured to cause the supporting arm to retract the dispensing needle while the first programmable logic controller is causing the epoxy injector to dispense the epoxy; and
    an epoxy degasser configured to degas the epoxy, wherein the epoxy degasser comprises a centrifuge and a vacuum degasser.

2. The system of claim 1, further comprising:
    a first epoxy curing device configured to cure the epoxy at a first temperature; and
    a second epoxy curing device configured to cure the epoxy at a second temperature.

3. The system of claim 1, wherein the first programmable logic controller is further configured to cause the epoxy injector to dispense the determined dispensing amount of epoxy at a constant dispense rate by adjusting air pressure in the epoxy injector to correspond to a change in viscosity of the epoxy.

4. The system of claim 1, wherein the second programmable logic controller is further configured to cause the supporting arm to retract the dispensing needle at a variable retraction rate based on at least one of a size and shape of the selected container.

5. The system of claim 1, wherein at least one of the first programmable logic controller and the second programmable logic controller are configured to access a data store to identify at least one of a dispensing amount, a dispensing rate, and a retraction rate associated with the selected container.

* * * * *